United States Patent Office 3,254,717
Patented June 7, 1966

1

2

3,254,717
FRACTURING PROCESS AND IMPREGNATED PROPPING AGENT FOR USE THEREIN

Jimmie L. Huitt, Shaler Township, Allegheny County, and Bruce B. McGlothlin, O'Hara Township, Allegheny County, Pa., assignors to Gulf Research & Development Company, Pittsburgh, Pa., a corporation of Delaware No Drawing. Filed Nov. 19, 1962, Ser. No. 238,771
14 Claims. (Cl. 166—42)

This invention relates to the production of fluids from wells and more particularly to an improved propping agent useful in increasing the fluid-flow capacity of fractures extending from wells.

Hydraulic fracturing is widely used in the completion or working over of a well to stimulate production from the well. The fracturing is ordinarily accomplished by applying pressure to a liquid in the well in contact at the level of the desired fracture with an exposed portion of the formation surrounding the well. The pressure on the liquid is increased until it exerts a force on the exposed formation adequate to overcome the weight of the overburden and the tensile strength of the formation. Fracturing of the formation is usually indicated by a sudden drop in the pressure on the fracturing liquid.

After a fracture has been created, it is ordinarily extended for a desired distance from the well by displacing a suitable low fluid-loss liquid into the fracture. Propping agents are displaced into the fracture either in the low fluid-loss liquid used to extend the fracture or in a following liquid. After displacement of the propping agent into the fracture, the pressure on the liquid in the well is released, whereupon the fracture closes on the propping agent. The propping agent holds the faces of the fracture apart to provide a channel through which formation fluids can flow to the well.

Propping agents are granular particles which may range in size from about 4 to about 60 mesh in the U.S. Sieve Series. Sand is widely used as a propping agent because of its low cost. Although sand is suitable in many instances, it is brittle and when used to prop a fracture in hard formations subjected to a high overburden pressure is crushed into very fine particles when pressure on the fracturing fluid is released. Sometimes the fine particles of sand resulting from the crushing are washed from the fracture and at other times they move toward the well with the produced fluids and become lodged in small openings between packed sand particles. In either event, the fluid-flow capacity of the fracture is seriously reduced.

Propping agents of a malleable or deformable material have been suggested to eliminate the shortcomings of sand as a propping agent. When the pressure on the fracturing fluid is released, the overburden settles on the deformable material which, instead of crushing like sand into fine particles, is flattened slightly but remains in place to hold the faces of the fracture apart. Particles of aluminum have been suggested for propping fractures in hard formations. It has been found, however, that particles of aluminum are frequently deformed in passing through the pump for the fracturing fluid. Moreover, some of the solutions present in underground formations cause rapid corrosion of finely divided aluminum particles.

Propping agents made up of plastic particles have also been suggested. It is difficult to obtain a plastic which has the desired characteristics of hardness and strength. Plastics that have sufficient hardness to support a high compressive load are usually brittle. Softer and tougher plastics usually are gradually deformed or creep when loaded for extended periods. Creeping is a particularly serious defect which may cause the fracture to become completely plugged by particles of the propping agent merging with adajcent particles.

This invention resides in a novel propping agent particularly useful for propping fractures in hard formations subjected to high overburden pressures and capable of resisting deterioration by fluids present in the underground formation to produce fractures of high fluid flow capacity. The propping agent comprises hard individually discrete particles of seeds impregnated with resins resistant to oil and to water.

The particles from which the propping agents of this invention are prepared are particles of hard parts of seeds of plants. Examples of suitable particles are the shells of nuts, such as black walnuts, pecans, and hickory nuts, and the hard shells of brazil nuts or coconuts. The endocarps or drupes such as peaches, plums, apricots, and pears are also suitable. The hard seed particles should have a sphericity and roundness, as those terms are defined in "Stratigraphy and Sedimentation" by Krumbein and Sloss, pages 78 through 83, published by W. H. Freeman Company, 1951 edition, above 0.7, preferably above 0.8 and still more desirably in the range of 0.8 to 0.9.

The propping agents of this invention are made up of rounded particles which pass through No. 4 screens of the U.S. Sieve Series and are retained on No. 40 screens. A narrow range of particle size, for example, 4 to 20 mesh, and still more preferably spanning five screen numbers or less of the U.S. Sieve Series, for example, 8 to 12 mesh, or 12 to 20 mesh, is particularly effective as a propping agent because each of the particles acts to support the fracture surfaces when pressure on the fracturing fluid is released, and the absence of fine particles avoids plugging small openings between particles of the propping agent. In describing particles as having a size of 12 to 20 mesh, it is meant that the particles will pass through a No. 12 screen in the U.S. Sieve Series but will be retained on a No. 20 screen of that series. A similar method is used in defining other particle sizes. The particles of the desired size can be obtained by crushing the shells or seeds followed by a screening operation in which oversize particles are recirculated for further crushing. Particles in the desired size range are then rounded in suitable equipment, for example, by passing between closely spaced rotating abrasive discs.

The granular rounded particles of seeds are impregnated with liquids, referred to as resin-forming liquids, which will set to form a resin which is insoluble in oil or aqueous liquids. The setting may be the result of condensation, polymerization, or any other reaction which will transform the liquid used in the impregnation to a solid material. Resin-forming liquids which set to form hard resins, as contrasted with soft rubber-like resins, are preferred to provide propping agents with high resistance to deformation as well as toughness. Examples of suitable resins are phenol-formaldehyde, urea-formaldehyde, cresol-formaldehyde, phenol-furfural, melamine-formaldehyde, and furfuryl alcohol- maleic anhydride. Liquids such as Bis-Phenol-A–epichlorohydrin which harden when mixed with a catalyst or hardener such as an aliphatic amine to form an epoxy resin are also suitable. Other resins which will impart the desired properties to the hard particles of seeds are polymers of styrene, vinyl chloride, vinylidene chloride, and poly esters formed by reaction of polyhydric alcohols with polybasic acids. The essential characteristic of the resin-forming liquids is that they will set to form a resin which is resistant to both water and oil and will contribute to the rigidity of the seed particles.

The particles of propping agent are impregnated with the resin-forming liquid by any of the conventional impregnating methods which will infuse the resin-forming liquid into the interior portion of the particles. A layer of the resin-forming liquid covering the outer surface of the particles of propping agent at the end of impregnation is not desirable but is not particularly harmful as long as the coating is thin and, hence, does not form an outer layer of less strength than the impregnated seed. Because of the small size of the particles, substantially uniform impregnation is not difficult.

A preferred method of impregnating the hard particles is to evacuate a vessel containing the seed particles for an extended period, for example, 2 hours, and then cover the particles with the nonresinous resin-forming liquid and apply a high pressure of the order of 5,000 p.s.i. to the liquid. After pressure has been maintained on the liquid for a period adequate to force the liquid into the seed particles, the resin-forming liquid is allowed to drain from the surface of the particles and a portion of the liquid remaining on the individual particles is removed, for example, by tumbling the impregnated particles over an absorptive pad. The impregnated particles are then treated to convert the resin-forming liquid to the desired solid resin. The treatment used to cause setting of the resin will depend upon the particular resin-forming liquid used to impregnate the particles and may consist of merely heating the particles. With some resins it may be necessary to heat the particles while simultaneously passing a liquid or gaseous catalyst in contact with the particles.

It has been found that fractures propped with the novel propping agent of this invention have higher fluid-flow capacities than fractures propped with the propping agent consisting of the resin alone or untreated particles, as shown by the following examples:

EXAMPLE I 8 to 12 mesh particles of black walnut shells having a roundness and sphericity of approximately 0.8 were dried in a vacuum oven at 176° F. and at an absolute pressure of 10 mm. of mercury. The particles were then placed in a vacuum flask maintained at an absolute pressure of 10 mm. of mercury and saturated with a mixture of 100 parts of furfuryl alcohol and 8 parts of maleic anhydride. The resin-forming liquid and particles were transferred to a pressure vessel and the pressure maintained at 5,000 p.s.i. for one hour. The particles of the propping agent were removed from the pressure vessel and allowed to set at room temperature for 14 hours, after which the slightly viscous resin on the surface of the particles was removed, and the particles were coated with a silicone grease to prevent the particles from sticking together. The impregnated particles were heated to 140° F. and maintained at that temperature for 6 hours to complete the setting of the resin.

EXAMPLE II 8 to 12 mesh particles of black walnut shells were evacuated at 176° F. and 10 mm. of mercury and then saturated with a mixture of Bis-Phenol-A–epichlorohydrin, diluted with a glycidal ether, and an aliphatic amine hardener in a vacuum flask maintained at a pressure of 10 mm. of mercury. The particles and sufficient resin-forming liquid to cover them were transferred to a pressure vessel and subjected to a pressure of 5,000 p.s.i for one hour. The impregnated particles were removed from the pressure vessel, wiped dry of the liquid, and coated with a silicone grease to prevent them from sticking together. Thereafter, the impregnated particles were heated for 16 hours at a temperature of 140° F. and atmospheric pressure to cause the epoxy resin to set.

The effectiveness of the impregnated black walnut particles as propping agents was measured by determining the fluid-flow capacity of simulated fractures held open under different compressive loads by the impregnated nut shell particles. A simulated fracture was constructed from a cylindrical core sawed lengthwise. The impregnated particles were distributed in a partial monolayer between the faces of the sections of the core at a concentration of 15 particles per square inch, the concentration which had been found to give peak fracture flow capacity. The simulated fracture was placed in a standard test cell equipped for passing a liquid through the fracture and measuring the pressure drop across the fracture as well as for applying a compressive load to the particles between the sections of the core. The fluid-flow capacity of the fracture was determined by passing a liquid of known viscosity through the simulated fracture at a measured rate. The pressure drop through the fracture was measured and the fluid-flow capacity was calculated in terms of millidarcy feet. The procedure was repeated for simulated features of cores of different sandstone formations and for different compressive loads. The results of the flow capacity determinations are presented in Table I.

EXAMPLE III

A commercial plastic propping agent consisting of 8 to 12 mesh spherical particles of a polystyrene resin was placed between the faces of a simulated fracture of a medium-hard formation in a test cell in the manner described above for Examples I and II, and the flow capacity of the simulated fracture determined.

EXAMPLE IV

Cylindrical particles 2 mm. in length and 2 mm. in diameter were made from a resin prepared from 100 parts by weight of furfuryl alcohol and 5 parts of maleic anhydride which had been treated as described in Example I to cause setting of the resin. Particles of the resin were set on end in a simulated fracture in a medium hard formation at a concentration of 15 particles per square inch, and the flow capacity of the fracture determined at different overburden pressures.

EXAMPLE V

Particles of resins were prepared by mixing the Bis-Phenol-A–epichlorohydrin diluted with the glycidal ether described in Example II with the aliphatic amine hardener described in that example in the same proportion used in Example II of four parts of the resin-forming liquid to one part of the hardener, and the mixture treated as described in Example II to cause the resin to set. Cylindrical particles of the resin 2 mm. in diameter and 2 mm. long were set on end at a concentration of 15 particles per square inch between sections of a medium hard formation to form a simulated fracture. The fracture flow capacities were determined at different overburden pressures. The results of the experimental work are presented in Table I.

EXAMPLE VI

Untreated 8 to 12 mesh particles of black walnut shells, similar to the particles impregnated in Examples I and II were placed between the faces of simulated fractures of the two formations tested for Examples I and II at a concentration of 15 particles per square inch and the fracture flow capacities of the simulated fractures determined at several overburden pressures. The results of the tests are presented in Table I:

*Table I*

FRACTURE FLOW CAPACITY (MD. FT.[1])—SIMULATED FRACTURES IN MEDIUM HARD SANDSTONE

| Overburden Pressure (p.s.i.) | Impregnated Walnut Shells (Example I) | Impregnated Walnut Shells (Example II) | Plastic (Example III) | Furfuryl Alcohol Maleic Anhydride Resin (Example IV) | Epoxy Resin (Example V) | Untreated Walnut Shells (Example VI) |
|---|---|---|---|---|---|---|
| 3,000 | 60,000 | 80,000 | 34,000 | 4,000 | 1,500 | 40,000 |
| 5,000 | 40,000 | 60,000 | 23,000 | 3,000 | 600 | 20,000 |
| 7,000 | 30,000 | 40,000 | 17,000 | 2,000 | 400 | 15,000 |
| 10,000 | 25,000 | 30,000 | 13,000 | 500 | 200 | 6,000 |
| FRACTURE FLOW CAPACITY (MD. FT.[1])—SIMULATED FRACTURES IN MEDIUM SOFT SANDSTONE | | | | | | |
| 3,000 | 50,000 | 80,000 | ---------- | ---------- | ---------- | 40,000 |
| 5,000 | 35,000 | 60,000 | ---------- | ---------- | ---------- | 25,000 |
| 7,000 | 25,000 | 30,000 | ---------- | ---------- | ---------- | 20,000 |
| 10,000 | 17,000 | 25,000 | ---------- | ---------- | ---------- | 10,000 |

[1] Millidarcy feet.

It will be noted from Table I that the walnut shells impregnated with epoxy resins resulted in a fracture in a medium hard formation having a flow capacity twice the flow capacity produced by the untreated walnut shells when the fracture was subjected to an overburden pressure of 5,000 p.s.i. The epoxy-resin-impregnated walnut shells produced a fracture having a flow capacity approximately 50 times as high as the fracture propped with particles of the epoxy resin. The percentage increase in the flow capacity of the fracture was even greater for the epoxy-resin-impregnated walnut shells when the overburden pressure was increased to 10,000 p.s.i. Improvements in the flow capacity of the simulated fractures were only slightly smaller for fractures propped with walnut shells impregnated with the furfuryl alcohol-maleic anhydride impregnated resin than for the fractures propped with the epoxy-resin-impregnated propping agents. The impregnation of walnut shell particles with resins also produced propping agents which caused increased flow capacity of fractures in medium soft formations; however, the percentage of increase in fluid-flow capacity of the fractures was not as great as in the harder formations.

In a preferred method of using the novel resin-impregnated propping agents of this invention, a fracture is created by pumping a penetrating liquid such as water or a dilute solution of hydrochloric acid down a well and into an exposed face of the subsurface formation at the location of the desired fracture. The penetrating liquid is followed down the well by a volume of a nonpentrating liquid, preferably free of propping agent, calculated to extend the fracture for the desired distance from the well. The pressure on the well is increased to break down the formation to be fractured. A liquid having about 0.05 to 5 pounds of the propping agent per gallon suspended in it follows the nonpenetrating liquid down the well and is displaced from the well into the fracture. The well is shut in to allow leaking of the liquid from the fracture into the surrounding formation whereby the propping agent is deposited in the fracture. Pressure in the well is then reduced and the well produced by formation pressure or, if necessary, by suitable pumping means.

We claim:

1. A propping agent for propping a fracture in a subsurface formation comprising hard granular particles of plant seeds impregnated substantially throughout the particles with a resin insoluble in oil and in water, the size of seed particles being in the range of 4 to 40 mesh in the U.S. Sieve Series.

2. A propping agent as set forth in claim 1 in which the particles are shells of black walnuts.

3. A propping agent as set forth in claim 1 in which the resin is an epoxy resin.

4. A propping agent as set forth in claim 1 in which the resin is a condensation product of a phenol and an aldehyde.

5. A propping agent as set forth in claim 1 in which the resin is a phenol-formaldehyde condensation product.

6. A propping agent as set forth in claim 1 in which the resin is a furfuryl alcohol resin.

7. A propping agent for propping fractures in subsurface formations comprising hard granular particles of plant seeds impregnated substantially throughout the particles with a resin insoluble in oil and in water, the size of said particles being between 4 and 40 mesh in the U.S. Sieve Series and spaning a maximum of five numbers in said series.

8. A propping agent as set forth in claim 7 in which said granular particles have a roundness and sphericity higher than about 0.7.

9. A method of preparing a propping agent for propping fractures in subsurface formations comprising impregnating hard granular particles of plant seeds substantially throughout the particles with a liquid capable of setting to form a resin insoluble in oil and in water, said particles having a size in the range of 4 to 40 mesh in the U.S. Sieve Series, and thereafter treating the particles to cause setting of the liquid to form the resin.

10. A method of treating a well to increase the flow capacity thereof comprising creating a fracture extending from a well into a surrounding formation, and displacing into said fracture a suspension of a liquid containing hard granular particles of plant seeds impregnated substantially throughout the particles with a resin insoluble in oil and in water, said particles of plant seeds having a size in the range of 4 to 40 mesh in the U.S. Sieve Series.

11. A propping agent for holding open fractures in subsurface formations comprising hard granular particles of plant seeds impregnated substantially throughout such particles with a resin insoluble in oil and in water, the size of said particles being between 4 and 40 mesh in the U.S. Sieve Series, and said particles having a roundness and sphericity in excess of about 0.7.

12. A propping agent as set forth in claim 11 in which the seed particles are particles of black walnut shells.

13. A method of preparing a propping agent for propping fractures in subsurface formations comprising evacuating hard granular particles of plant seeds having a size in the range of 4 to 40 mesh in the U.S. Sieve Series, immersing said evacuated particles in a resin-forming liquid, applying pressure to said immersed particles to infuse said resin-forming liquid into the interior portion of said particles, removing excess resin-forming liquid from the exterior of said particles, and treating said particles to convert the resin-forming liquid to a resin insoluble in oil and in water.

14. A method of treating a well to increase the production capacity thereof comprising displacing down the well and into contact with a surrounding formation a liquid capable of penetrating said formation, following said liquid with a nonpenetrating liquid, increasing the pressure on the nonpenetrating liquid until a fracture is created extending from the well into the surrounding formation, following the nonpenetrating liquid with a suspension in a liquid of hard granular particles of plant seeds impregnated substantially throughout the particles with a resin insoluble in oil and in water, said particles of plant seeds having a size in the range of 4 to 40 mesh in the U.S. Sieve Series, and releasing the pressure of the liquid in the fracture to deposit the particles in the fracture.

References Cited by the Examiner

UNITED STATES PATENTS

| | | | |
|---|---|---|---|
| 2,788,072 | 4/1957 | Goodwin | 166—42 |
| 2,811,207 | 10/1957 | Clark | 166—42 |
| 2,823,753 | 2/1958 | Henderson et al. | 166—42.14 |
| 2,879,847 | 3/1959 | Irwin | 166—42 |
| 3,026,938 | 3/1962 | Huitt | 166—42 |

CHARLES E. O'CONNELL, *Primary Examiner.*

C. H. GOLD, S. J. NOVOSAD, *Assistant Examiners.*